Figure 1:
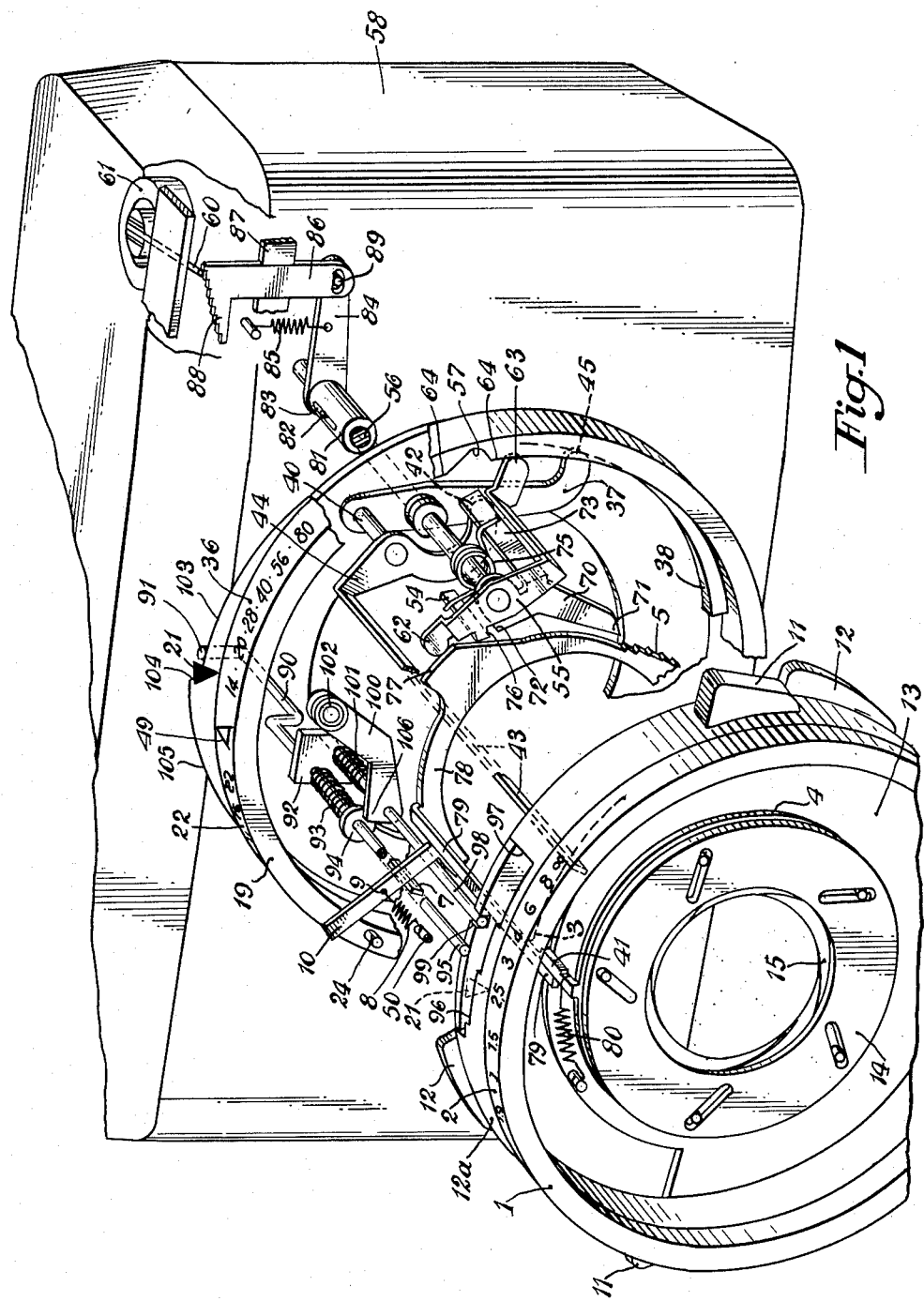

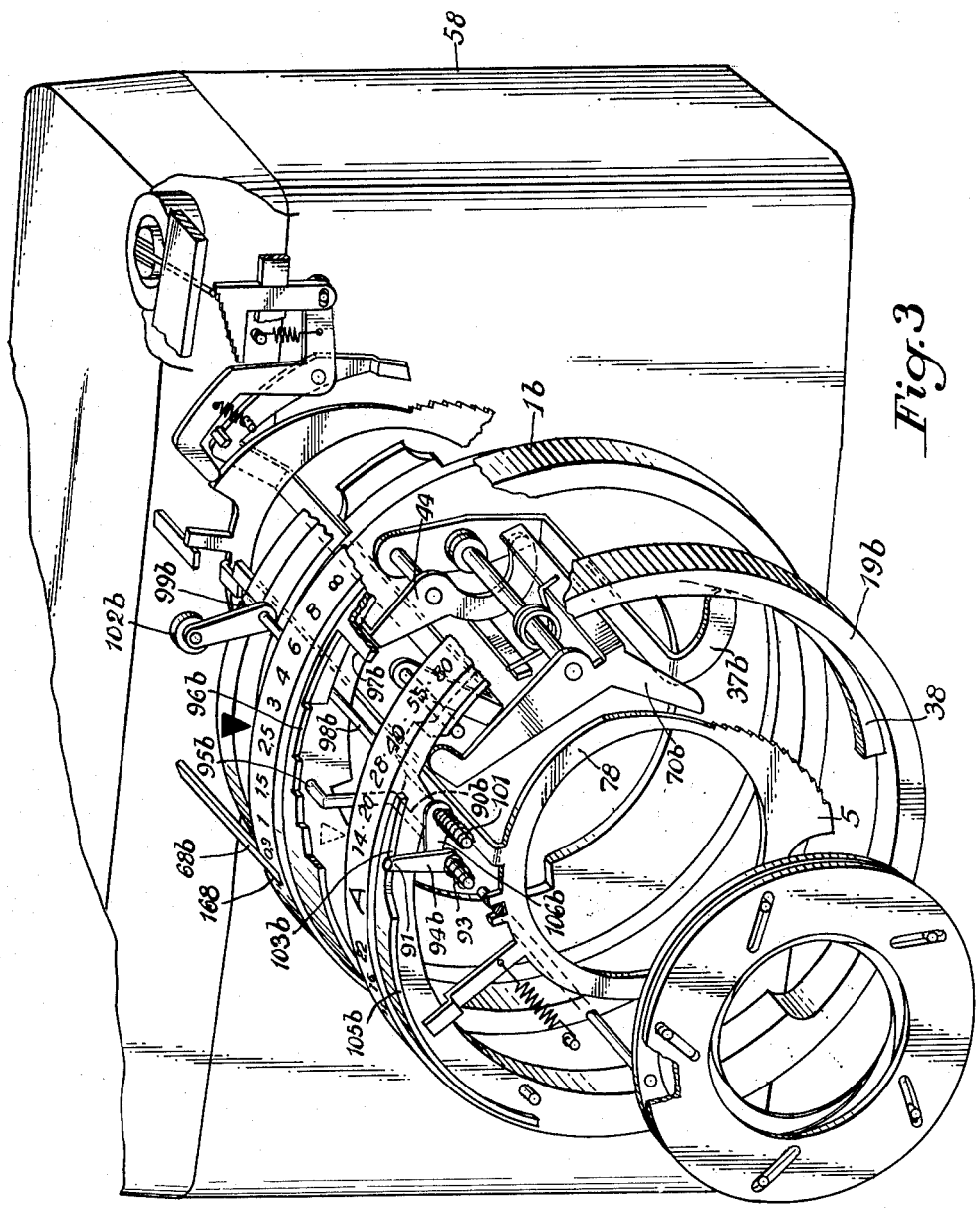

United States Patent Office 3,129,647
Patented Apr. 21, 1964

3,129,647
PHOTOGRAPHIC CAMERA OR SHUTTER PROVIDED WITH AN INTERCHANGEABLE OBJECTIVE
Heinz Köppen, Stuttgart, and Willi Gunther, Stuttgart-Mohringen, Germany, assignors to Zeiss Ikon Aktiengesellschaft, Stuttgart, Germany
Filed July 24, 1962, Ser. No. 212,019
Claims priority, application Germany July 26, 1961
14 Claims. (Cl. 95—10)

This invention relates to a camera whose objective or shutter is provided with an automatic flash bulb exposure mechanism and, if desired, also with other operating ranges, such as a manually operable diaphragm adjustment and/or diaphragm preselection and an automatic exposure adjusting mechanism. The desired operating range is adjusted by a single operating member, such as a ring, which is provided with scales, marks, etc., and actuates control devices by means of which the nonselected operating ranges are rendered ineffective.

It is the purpose of an automatic flash bulb exposure mechanism to form the proper diaphragm aperture automatically in dependence of the adjusted guide number and distance so that the photographer is able to make flash bulb exposures without having to make calculations regarding the correct diaphragm aperture.

For the solution of this problem it has been proposed heretofore to provide the automatic flash bulb exposure mechanism with means which control the diaphragm mechanism in dependence of the adjusted guide number and the adjusted distance in such a manner that these values in accordance with the equation Guide number=diaphragm × distance result in the corresponding correct diaphragm aperture. These mentioned means consist primarily of deflection cams arranged on a guide number adjusting ring and on the distance adjusting ring, and of rotatably mounted levers or the like which scan these mentioned cams and transfer the deflections obtained by this scanning action to an influencing member for the diaphragm mechanism, which influencing member is permanently or temporarily connected with the rotatable diaphragm cage. In a diaphragm mechanism in which the diaphragm aperture adjusts itself immediately, this influencing member consists of a catch member or abutment member fixedly connected to the rotatable diaphragm cage and transforms the sum of guide number and distance received by the scanning levers directly into a single diaphragm control. In a diaphragm mechanism in which the diaphragm aperture is formed upon release of the camera (automatic diaphragm or pressure diaphragm), there is provided a stop member and particularly a path compensator which becomes effective only upon release of the camera. This path compensator consists of a pivotally mounted lever having at one end a catch tooth and which lever is deflected by the scanning levers, and an integral series of abutments in the form of radially extending steps arranged on the rotatable diaphragm cage. In the tensioned condition of the camera, no engagement of catch member with said series of steps will take place. The catch tooth is positioned at a distance away from the series of abutment steps which corresponds to the adjusted guide number and distance values. Assuming that in the tensioned condition of the camera the rotatable diaphragm cage is arrested in an extreme position corresponding to the largest diaphragm aperture, and that upon release of the camera this diaphragm cage by means of the force of a spring performs a return movement toward the smallest diaphragm aperture, the duration of this return movement will then depend from the distance in which the catch tooth is positioned with respect to the series of abutment steps. If low guide numbers and large distance values are adjusted, this distance is small so that already after a short return movement of the diaphragm cage the catch tooth comes into engagement with one of said series of steps which results in the adjustment of a still large diaphragm aperture. If high guide numbers and small distance values are adjusted, however, the distance between the catch tooth and the series of abutment steps is large so that only after a longer return movement of the diaphragm cage an engagement of the catch tooth with one of the series of steps will take place, which means that the diaphragm was able to close itself to a greater extent.

In automatic flash bulb exposure mechanisms heretofore proposed to be used in connection with interchangeable objectives there is, however, the possibility that distance values may be adjusted which no longer correspond to the operative conditions of the automatic flash bulb exposure mechanism, and thus may cause a faulty exposure of the film. In order to overcome this and other minor disadvantages and to assure a safe operation of a camera or of a shutter provided with an automatic flash bulb exposure mechanism and an interchangeable lens system, it is the object of the invention to provide the distance adjustment ring or the distance scale ring of the interchangeable lens system with a limitation means for the adjustability of distance values which cooperates with a scanning member controlled by a deflection cam arranged on the guide number adjusting ring.

According to a preferred construction of the invention, the limitation means for the adjustability of distance values consists of a series of steps arranged on the distance adjustment ring or on the distance scale ring provided on the interchangeable objective. This series of steps cooperates with an oppositely positioned stop member operating as a catch member.

This series of steps may consist of unilaterally graduated steps which have the effect that when higher guide numbers are adjusted, the adjustment of smaller distance values is blocked step by step, while the adjustment of too great distance values is blocked by a single straight stop.

According to another developed example of the invention, the series of steps may consist of a bilateral step sequence by means of which and in cooperation with the catch member a blocking of distance values, which are graduated from small to large, is made possible.

These and other objects of the invention will now be explained in detail with reference to the accompanying drawings which illustrate photographic cameras equipped with interchangeable lens systems and provided with the three operating ranges mentioned in the foregoing. All examples of the photographic camera according to the invention are understood to be equipped with an automatic diaphragm mechanism which is controlled by a rotatable diaphragm cage.

Figure 2:
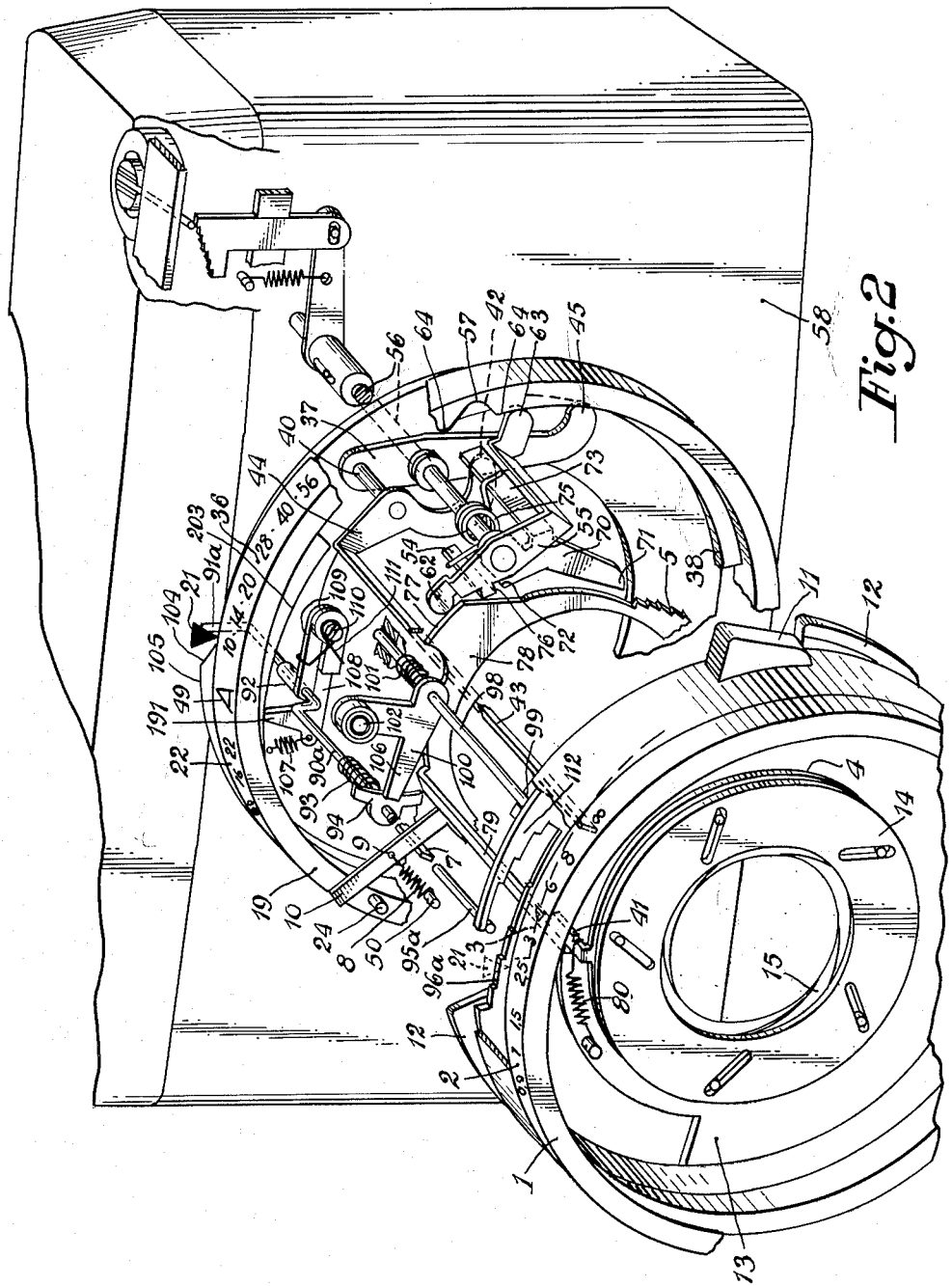

In the drawings:

FIG. 1 illustrates diagrammatically one embodiment of a camera of the invention, FIG. 2 illustrates diagrammatically another embodiment of a camera of the invention, and FIG. 3 illustrates diagrammatically still another embodiment of a camera of the invention.

Referring to FIG. 1, the camera casing is designated with 58, while 1 is a distance adjusting ring and 19 an actuating ring which latter has arranged thereon in serial arrangement a guide number scale 36 ranging from 14 to 80 and a diaphragm scale 22 ranging from $f$:1.4 to $f$:22, and between these scales a mark "A" 49 indicating the operating range of the automatic exposure control. The distance adjusting ring 1 is rotatably arranged on the mount 12a of the interchangeable objective and is provided with a distance scale 2. The handles for the distance adjustment ring 1 are designated with 11 and the numeral 12 refers to the bayonet projections on the lens mount 12a. The common index for all scales is designated with 21, and 13 is a part of the mount of the interchangeable lens system.

The diaphragm mechanism arranged within the interchangeable objective comprises a stationary diaphragm cage 14 and a rotatable diaphragm cage 4 which effects the opening and closing of the diaphragm segments 15. The rotatable diaphragm cage 4 is controlled by an intermediate ring 78 which is arranged on the camera and is connected with the diaphragm cage 4 by a coupling rod 79 engaging an abutment arm 41 arranged on the circumference of the diaphragm cage 4. A spring 80 attached with one end to said arm 41 seeks to rotate the diaphragm cage 4 toward a closing of the diaphragm segments, i.e. counterclockwise. The intermediate ring 78 is also provided with a radial projection 10 which has attached thereto at 9 one end of a spring 8 the other end of which is fastened at 50 to a stationary part of the camera. If the shutter or the camera is tensioned, this ring 78 by means of a shutter operated locking member 7 is held against the action of the spring 8 in one end position which corresponds to a fully open diaphragm aperture. Upon release of the camera, the locking member 7 snaps back into a position in which the diaphragm mechanism is released for its return movement.

The distance adjustment ring 1 is provided on its inner circumference with a deflection cam 3 which at the smaller distance values projects substantially toward the optical axis, but becomes flatter with the adjustment to larger distance values. The actuating ring 19 is provided on its inner circumference with a deflection cam 38 which conforms to the guide numbers to be adjusted. That portion of the cam 38 which projects closest towards the optical axis corresponds to high guide numbers while the flatter portion farthest away from the optical axis corresponds to smaller guide numbers.

In cooperation with these cams 3 and 38, respectively, are arranged intermediate elements in the form of pivotally mounted scanning levers which individually store the adjusted distance and guide number values and transfer them to an influencing member which in turn stores all adjusted values and upon release of the camera transfers them to the diaphragm mechanism for the purpose of forming the proper diaphragm aperture.

The deflection cam 3 arranged on the distance adjustment ring 1 cooperates with a lateral arm 43 on a scanning lever 44 rotatably mounted between its ends about a pin 40. The deflection cam 38 arranged on the actuating ring 19 cooperates with a scanning lever 37 rotatably supported between its ends by the shaft 56. The scanning lever 37 has a lower curved end 45 which is in engagement with the cam 38. The upper end of the lever 37 carries the pin 40 on which the lever 44 is mounted.

It will be noted from the drawing that any deflections of the scanning lever 37, which take place when the guide number on the ring 19 is changed, have the result that the lever 37 rotates about the axis 56 and that thereby the position of the lever 44 is changed since the pin 40 is carried by the upper end of the lever 37. If the lever 37, for instance, performs a clockwise rotation as a result of a change in the guide number, the pin 40 also rotates clockwise. Since, however, the arm 43 of the lever 44 engages the cam 3, it will perform a counterclockwise rotation which means that the lower end 42 of the lever 44 will move upwardly (counterclockwise).

As already stated, the arm 43 on the distance scanning lever 44 engages the cam 3 on the distance adjustment ring 1. If smaller distance values are adjusted, the arm 43 follows the deflection of the cam 3 and moves counterclockwise, namely toward the optical axis, which has the result that the lower lever end 42 moves up. It will be noted that an adjustment to higher guide numbers and smaller distance values will bring about a counterclockwise rotation of the scanning lever 44, while in the illustrated position an adjustment of larger distance values will result in a clockwise rotation of the lever 44. An adjustment to still smaller guide numbers as indicated is not possible because the index 21 is already opposite the smallest guide number 14.

Owing to the fact that the axis of rotation of the scanning lever 44 formed by the pin 40 is carried by the scanning lever 37, both scanned values are stored in the lever 44. In other words, the position of the lever end 42 constitutes the result of the adjusted values of guide number and distance. The lever end 42 thus is adapted to control an influencing member which in cooperation with the diaphragm mechanism determines the formation of the diaphragm aperture for the automatic flash bulb exposure range.

The control of such an influencing member by the lever end 42 is made possible according to a particular feature of the invention in that the lever end 42 is brought into engagement with a laterally extending arm 73 provided on a catch lever 70 which serves as an influencing member for the diaphragm mechanism and is provided at its lower end with a tooth 71. This catch lever 70 is loosely rotatably mounted between its ends on the same shaft 56 which forms the rotatable support for the scanning lever 37. This shaft 56 forms at the same time the operating shaft for the scanning device associated with the measuring instrument pointer 60 which in the range of the automatic exposure control mechanism is used to determine the size of the diaphragm aperture. This scanning device consists primarily of a link combination 84, 86 connected by a pin and slot connection 89, wherein the vertically movable link 86 is guided for vertical movement in a slide bearing 87. The link 86 has arranged at its upper end an enlargement provided with a series of steps 88 which cooperate with the pointer 60 of the measuring instrument 61. One end of the link 84 is attached to a sleeve 81 which by means of a pin and slot connection 82, 83 is held in operative connection with the operating shaft 56 even when the camera objective is axially adjusted during focusing. A spring 85 acts upon the link 84 and seeks to pull the link 86 upwardly and rotate the shaft 56 counterclockwise.

The automatic exposure control mechanism also contains a control lever 55 which is fixedly mounted on the rotatable shaft 56. This control lever 55 has a lower offset scanning end 63, an upper scanning end 62 and a contact surface 54 which is engaged by one end of a torsion spring 75 coiled about the shaft 56. The other end of the torsion spring 75 engages a lateral projection 73 of the catch lever 70. This spring 75 seeks to urge the lever end 62 against a raised portion 77 on the intermediate ring 78 and the lever end 63 against the cam surfaces 64 on the actuating ring 19. Furthermore, the spring 75 by means of the coupling 42, 73 causes the scanning projection 43 of the lever 44 to be pressed against the cam 3 while the scanning end 45 of the lever 37 is pressed against the cam 38. Finally, the spring 75 also urges the tooth 71 of the catch lever 70 toward its operative position with the intermediate ring 78.

The intermediate ring 78 is provided with a series of steps 5 which are approximately radial. This series of steps 5 form together with the catch member 70 a path compensator which permits the catch member 70 to adjust the diaphragm to predetermined apertures after release of the ring 78 and subsequent rerun because the catch member 70 is forced to assume predetermined angular positions. If for instance the tooth 71 of the catch lever 70 is close to the series of steps 5 as a result of an adjusted long distance and a small guide number, the rerun of the ring 78 and therewith of the diaphragm cage 4 effected by the camera release will be stopped already after only a small movement which means that the diaphragm has not been closed or only very little. If, however, a higher guide number and a smaller distance value has been set, then the tooth 71 of the catch member 70 will be positioned at a larger distance away from the series of steps 5. Consequently, the return movement of the ring 78 will be much longer before it comes to an engagement between the series of steps 5 and the tooth 71, which means that the diaphragm has been closed down to a smaller aperture.

It has been described before that the lever end 63 of the control lever 55 engages the actuating ring 19 at the areas 64 on the inner circumference of this ring. Between these areas 64 is arranged a recess 57 into which the lever end 63 may enter. The areas 64 form the disconnecting areas for the automatic exposure control mechanism which come into effect when the camera has been adjusted for using the automatic flash bulb exposure mechanism or the range of the manual diaphragm setting, whereas the recess 57 acts as a connecting cam when the automatic exposure control mechanism is to be employed. In this latter case the lever end 63 drops into the recess 57 and the prior blocking of the movability of the control lever 55 and the shaft 56 is abolished.

It also has been stated before that the upper end 62 of the lever 55 engages the projection 77 of the ring 78 which likewise effects a blocking of the scanning device (the shaft 56 and the scanning means 84 to 89). This blocking takes place, however, only in the tensioned condition of the camera. Upon release of the camera the ring 78 commences to run counterclockwise whereby the lever end 62 slides off the projection 77 of the ring 78 and becomes freely movable. This means that in the tensioned camera the scanning device 84 to 89 is not operative. The pointer 60 of the measuring instrument 61 is able to move freely and to take the position which corresponds to the prevailing light conditions of the object to be photographed. Only upon release of the camera the scanning device is set free, the bar 86 with the scanning steps 88 jumps upwardly and comes to rest in an abutting position which depends from the adjusted position of the pointer. Obviously, there is provided a clamping device for the pointer 60 which, however, is not illustrated. The scanning position of the scanning device results in a definite rotative movement of the shaft 56 which in turn results in a corresponding taking along and adjusting of the catch lever 70 by means of the coupling surfaces 72, 76.

The already mentioned radial arm 10 on the ring 78 is positioned in such a manner that it serves as a stop for a pin 24 on the ring 19. These two members 10 and 24, when engaged, constitute the manual diaphragm adjustment. The stop 24 constitutes the preselection stop in the range of the manual diaphragm adjustment. If an aperture f:22 has been adjusted, the stop 24 is at its greatest distance away from the arm 10 which means that upon release of the camera the rings 78 and 4 are able to perform the longest possible return, whereas the return run is the shortest when the diaphragm aperture has been set to its largest size.

The distance adjustment ring 1 which is arranged on the interchangeable lens system is provided with a series of axially projecting steps 96 which serve as an automatic distance limitation in dependence of the adjusted guide number. This series of steps 96 cooperate with the forward end 95 of a catch rod 90 protruding from the camera or the shutter and extending parallel to the optical axis of the camera objective. This catch rod 90 has at the rear end an upwardly bent scanning portion 91 which slidingly engages a guide number deflection cam 103 arranged on the actuating ring 19. The catch rod 90 is longitudinally displaceably supported by a stationary plate 92, and a spring 93 is positioned between this plate 92 and a disc 94 on the rod 90. As will be noted from the pitch of the cam 103, the catch rod 90 moves in the direction of the series of steps 96 when higher guide numbers have been adjusted and moves away from the series of steps 96 when lower guide numbers are adjusted. This means that upon adjustment to lower guide numbers the total distance range from 1 meter to 8 m. may be covered by the series of steps 96, while this distance range becomes increasingly shorter by blocking of the shorter distance values on account of the engagement of the end 95 of the catch rod 90 with the corresponding steps of the series of steps 96 when the camera has been set for higher guide numbers. The distance of 8 m. is the upper limit of the distance range in the automatic flash bulb exposure mechanism. This upper limit is represented by a straight abutment shoulder 97.

Within the distance range made available by the automatic distance limitation there is always formed in dependence from the adjusted guide number the correct diaphragm aperture in conformance with the adjusted distance. If for instance the camera has been adjusted to the guide number 80, the smaller distance values like 1 m., 1.5 m., 2.5 m., and 3 m. are automatically excluded, since the objective is unable to produce an aperture ratio smaller than 1:22, in fact, only distance values of 3.6 m. to 8 m., which result in diaphragm apertures of $f:22$ to $f:10$, are available. As to the other extreme, a distance of 10 m. and the guide number 14 would still be workable because the resulting diaphragm aperture of $f:1.4$ could still be produced in accordance with the requirements. However, an extension of the distance range beyond 8 m. was not found practical because in such a case the deflection cam 3 becomes already so steep that scanning difficulties due to a jamming action must be expected. Moreover, a maximal distance of 8 m. is absolutely sufficient for all practical purposes.

Mounted in the plate 92 in addition to the catch rod 90 is also a locking rod 98 which locks the detachable lens system to the camera. This rod 98 after the completion of the attachment of the lens system engages a recess 99 in the lens mount 12a. When the lens system is to be removed again from the camera, the locking mechanism is released by an axial pressure upon the button 102. The locking rod 98 slides axially in its bearing and against the action of a spring 101 in the direction toward the camera, whereby the forward end of the rod 98 is withdrawn from the recess 99. At the same time the catch rod 90 is axially moved back toward the camera because the plate 100 on which the button 102 is mounted engages with its portion 106 the disc 94 on the rod 90. This withdrawal of the catch rod 90 from the region of the series of steps 96 is necessary since the deflection angle always exceeds the range of the angle of the series of steps, independent of the momentary position of the catch rod 90 with respect to the scale 2. The final engagement of the catch rod end 95 with one of the last steps of the series of steps 96 and the rotative adjustment of the exchangeable lens system which makes the stationary stops of the distance adjustment ring effective, would make a removal of the lens system impossible.

When changing the operation of the camera from the automatic flash bulb exposure range to other operating ranges, a disconnecting cam 105 arranged on the ring 19 engages the catch rod 90, 91. The catch rod 90 is axially pulled back by this cam 105 so far in the direction toward the camera that its forward end 95 leaves the range of the series of steps 96. This means that in the other operating ranges the distance may be selected without any limitation.

Upon attaching the interchangeable lens system to the camera by means of the bayonet projections 12, the coupling projections 41 and 79 come into engagement with one another and the scanning arm 43 comes into engagement with the distance deflection cam 3 on the ring 1. Furthermore, the locking rod 98 engages the recess 99 after a previous sliding along the rim of the lens mount 13, while the catch end 95 of the catch member 90 is positioned opposite the series of steps 96.

The operation in accordance with the preceding disclosure is as follows: If the automatic flash bulb exposure mechanism is to be used, the scanning levers 44 and 37 corresponding to the shape of the cams 3 and 38, respectively, are deflected. The counterclockwise rotation of the lever 44, which unites the sum of the deflections in its lever end 42, is the larger the smaller the adjusted distance and the higher the adjusted guide number is. The upward movement of the lever end 42 resulting from this counterclockwise rotation effects a taking along of the catch lever 70 also in counterclockwise direction so that the tooth 71 moves more and more away from the series of steps 5. This means that upon release of the camera and subsequent return run of the ring 78 the series of steps 5 will come into engagement with the tooth 71 only after a certain time so that a correspondingly smaller diaphragm aperture is formed.

Longer distances and lower guide numbers have the reversed result. The two scanning levers 37 and 44 perform clockwise movements so that the catch lever 70 also moves in clockwise direction. The tooth 71 therefore is close to the series of steps 5 so that already after a short return run of the ring 78 an engagement of the tooth 71 and the closest steps of the series of steps 5 will take place. Thus, the diaphragm is not closed at all or only to a negligible degree.

When the camera is adjusted to employing the automatic flash bulb exposure mechanism, any operation of the other adjustable operating ranges is precluded. The scanning device of the automatic exposure control mechanism is blocked in that the control lever 55 rests against one of the elevations 64 on the ring 19 and is therefore unable to move. The shaft 56 therefore serves only as a bearing pivot for the scanning lever 37 and the catch lever 70. To influence the diaphragm mechanism by the pin 24 of the range of the manual diaphragm selection is not possible since the stop 24 is so far away from the arm 10 that an encounter is impossible.

If now the camera is adjusted to the operating range of the automatic exposure control mechanism by moving the mark "A" 49 opposite the index 21, the lever end 63 of the control lever 55 will drop into the recess 57 of the ring 19 and the control lever 55 with the shaft 56 and the scanning device 84 to 89 are ready for action. In the tensioned condition of the camera, however, an operation is still not possible because the upper lever end 62 of the lever 55 is placed on the elevation 77 of the ring 78. Only when the camera is released and the ring 78 performs its counterclockwise return movement, the lever end 62 will run off the elevation 77, and the scanning device 84 to 89 is permitted to operate with the aid of the spring 85 for bringing one of the steps 88 into engagement with the pointer 60. The control lever 55, which serves not only for switching the automatic exposure control mechanism on and off in dependence of the selected range, but also for the direct taking along of the catch lever 70 (areas 72, 76), now guides the catch lever 70 into the rotative position which corresponds to the position of the scanning device and after a shorter or longer return run of the ring 78 an engagement of the tooth 71 with one step of the series of steps 5 will take place and therewith the corresponding formation of the diaphragm aperture. Upon a new tensioning of the camera the lever end 62 again will move up on the elevation 77 and the connection between the pointer 60 and the steps 88 is interrupted.

If the camera is adjusted to the operating range of the manual diaphragm selection by moving one of the values of the diaphragm scale 22 opposite the index 21, the pin 24 is moved so closely to its radial arm 10 that a diaphragm aperture corresponding to the selected values is assured by the engagement of the arm 10 with the pin 24 upon release of the camera.

The operation of the distance limiting means is likewise easily understandable from the foregoing disclosure. With the adjustment of low guide numbers the catch rod 90, due to the more projecting curve of the cam 103, is axially retracted in the direction toward the camera to such an extent that an engagement of the catch rod end 95 with one of the steps of the series of steps 96 is not possible. This has the result that in the extreme adjustment of the guide number 14 the distance range of 1 to 8 m. available for flash exposures is usable. The required apertures for flash exposures of $f:14$ to $f:1.75$ can be produced by the objective.

If it is desired to adjust the camera to a predetermined distance between 1 and 8 meters and a guide number higher than 14 and 20, a certain succession of steps must be carried out in the adjustment of the adjustment rings. For instance, the distance adjusting ring 1 must first be adjusted to within the flash bulb range and the largest possible distance of 8 meters and then the guide number on the actuating ring 19 must be selected. If this succession of steps is not observed, it is possible that the catch rod end 95 may remain on a step of the series of steps 99 which would correspond to a previously selected lower distance which now has to be excluded. If the actuating ring 19 has been adjusted to a guide number higher than 20, for instance 56, then the distance adjusting ring 1 has to be adjusted to the desired distance. If this distance is too small, as for instance 1 or 1½ meters, then a blocking of an adjustability of these values takes place by the engagement of the catch rod end 95 with the edges of the respective steps of the series of steps 99.

With the adjustment of higher guide numbers the catch rod end 95 moves steadily closer toward the series of steps 96, since the cam 103 controlling the catch rod 90 becomes increasingly flatter in this region. If, for instance, the guide number 56 is adjusted, the catch rod end 95 will engage already that step of the series of steps 96 which corresponds to a distance value of 2.5 m. so that the smaller distance values of from 1 m. to 2.5 m., which would require diaphragm apertures that cannot be produced any longer by the objective, are precluded from adjustability. The distance values of from 3 m. to 8 m. are still adjustable which in this case require diaphragm apertures of about $f:19$ to $f:7$. If the highest guide number 80 possible under the present conditions is adjusted, the distance range of 1 m. to 3.6 m. is automatically excluded but the distance range of 3.6 m. to 8 m. ($f:22$ to $f:10$) remains available.

The embodiment of the invention illustrated in FIG. 2, in which a guide number range from 10 to 80 and a diaphragm range from $f:2.8$ to $f:22$ is available, differs from the embodiment illustrated in FIG. 1 substantially by the addition of a portion 112 providing a series of steps instead of the single shoulder 97 forming the 8 m. stop as shown in FIG. 1. This portion 112 serves for the stepwise limitation of larger distance values. It is therefore possible to exclude stepwise the large distance values, when low guide numbers are adjusted, which would no longer fulfill the established exposure equation and thus would produce an unsatisfactory picture. Furthermore, the individual abutment steps 96a of the embodiment illustrated in FIG. 2 are radial in contrast to the axial steps 96 shown in FIG. 1 and cooperate with a catch rod 90a which is radially deflected by a radially projecting guide number cam 203 which is slidably engaged by a scanning nose 191. The catch rod 90a is further provided with the scanning end 91a which is in cooperation with the axially projecting disconnecting cams 104, 105 provided to switch the camera from the automatic flash bulb exposure range to another operating range. In order to prevent a jamming of the axially and radially controlled catch rod 90a when cooperating with the series of abutment steps provided at both sides, namely at 96a and 112, the catch rod 90a is subdivided by a coupling connection which consists of the levers 108, 109 rotatable about the axis 110 and which form together with the spring 111 a yieldable connection. A spring 107 urges the scanning nose 191 in the direction toward the control cam 203.

The operation of this distance limitation device is as follows: If lower guide numbers are adjusted, for instance the number 10, the catch rod end 95a swings outwardly due to the receding cam 203 so that it is removed from the radius of action of those steps of the series of steps which are associated with the smaller distance values. Therefore, the camera may be set for the smaller distance values. Larger distance values, however, which in combination with a low guide number require a diaphragm aperture that can no longer be produced by the objective, are blocked. Thus, if the camera is adjusted to the guide number 10, the distance range of 3.6 m. to 8 m. is blocked because the diaphragm apertures of $f:2.8$ and beyond, which would be necessary for a combination of the guide number 10 with any of the distance values between 3.6 m. and 8 m., can no longer be produced by the objective.

When adjusting the camera to guide numbers higher than 20, smaller distance values are automatically blocked in accordance with the numerical values of the example of FIGURE 1. If for instance, the guide number 28 is selected, the catch rod end 95a blocks on the series of steps 96a the last step corresponding to a distance of 1 meter; if the guide number 40 is selected the distance values of 1 and 1½ meters are no longer adjustable. When using the guide number 56, only distance values from 3 to 5 meters can be adjusted, while the adjustment of the guide number 80 has the result that the distance values from 1 to 3 meters cannot be adjusted.

Compared with FIGURE 1, the differences to be noted are that the catch rod 90 is movable along a cylindrical surface such that it moves away from the optical axis when low guide numbers are selected and adjusted, while the selection of higher guide numbers results in that the catch rod 90 moves in a direction closer to the optical axis. In the embodiment of FIGURE 2 this is caused by a radially projecting cam 203 which is engaged by a screening nose 191 rotatable about an axis 110 which extends parallel to the optical axis. Thus it is possible that the catch rod 95a can operate with two steps 96a and 112 which are positioned below and above the catch rod 95a and have radial steps. The steps 112 above the catch rod end 95a correspond to the greater distance values as for instance within a range from 3 to 8 meters. When the end of the catch rod 95a approaches this step when larger guide number values are selected, for instance 10 to 20, then the catch rod end 95a moves along the receding portion of the cam 203 and away from the optical axis. The steps 96a below the catch rod and 95a correspond to smaller distance values as for instance 1 to 3 meters. The catch rod end approaches the steps when higher guide number values are selected as for instance from 28 to 80 and the catch rod end 95 will approach the optical axis due to the projecting cam 203.

The embodiment of the invention illustrated in FIG. 3 differs from the two embodiments described in the foregoing in that an exchangeable lens system is used which contains all mechanical parts of the automatic flash bulb exposure mechanism including the distance scanning lever 44, the guide number scanning lever 37b, the intermediate ring 78 with its series of abutment steps 5 and the catch member 70b, and the actuating ring 19b with its cams 38, 57, 64, 103 to 105. The series of axial steps 96b for the automatic distance limitation is arranged on the distance adjustment ring 1b and is identical save the side of its location, with that illustrated in FIG. 1. Reversed are also the control and disconnecting cams 103b to 105b and the locking device 98b, 99b and 102b. The locking takes place by an engagement of the locking rod 98b into the recess 99b in the direction of the camera, and the release takes place by withdrawing the handle 102b toward the direction of the front of the lens. Due to the axial displacement of the catch rod 90b, which is associated with the coupling connection 94b, 106b, the catch rod end 95b moves out of the range of the series of steps 96b so that the lens system may be removed.

The series of steps 96b is unilaterally graduated in the same manner as illustrated in FIG. 1. The objective again shows the guide number values of 14 to 80 and the diaphragm apertures of $f:1.4$ to $f:22$. Distance adjustments over 8 m. are made impossible by means of the single straight shoulder stop 97b.

If the distance adjustment means is arranged in the exchangeable lens system, a removal of the catch rod 90b is not necessary when the lens system is removed, since the individual parts of the objective move as an entity without changing their position with respect to each other when they are disconnected. If, however, the threaded distance adjustment means is arranged on the camera while the distance ring on the objective is merely a distance scale ring which, as shown in FIG. 3, is connected with the threaded distance adjustment means by a protruding coupling rod 68b which engages the recess 168 on the distance scale ring, then the catch rod 90 has to be moved by the threaded distance adjustment means. The angle about which the lens system has to be rotated in order to be removed from the camera is equal or is at least made equal to the entire distance scale range available, for instance from 0.9 m. to ∞. Before this range can be swept over entirely, a blocking will take place, namely according to the direction of rotation at the distance values of 1 m. or 8 m., respectively.

What we claim is:

1. In a photographic camera, an interchangeable lens system, a distance adjusting ring arranged concentrically about the optical axis of said lens system, an adjustable diaphragm, means providing for flash bulb operation, a manually operable actuating ring for rendering said flash bulb operation effective, said actuating ring being provided on its outer circumference with a serially arranged guide number scale and on its inner circumference with cam means for operating pivotally mounted intermediate members which in response to an adjustment of said actuating ring control the adjustment of said adjustable diaphragm, the improvement comprising means for limiting the rotative adjustment of said distance adjusting ring, said limiting means including abutment steps on said distance adjusting ring, an element between the abutments of the distance adjusting ring and the actuating ring which is provided on one side facing the abutments with a catch end and on the other side facing away from the abutments forms a scanning member, and a deflection cam on said actuating ring, whereby the scanning end of said element engages the deflection cam of the actuating ring and is controlled by the latter so that the catch end in dependence of the adjusted guide number is caused to engage movement limiting abutments on said distance adjusting ring.

2. In a photographic camera, an interchangeable lens system, a distance adjusting ring arranged concentrically about the optical axis of said lens system, an adjustable diaphragm, means providing for flash bulb operation, a manually operable actuating ring for rendering said flash bulb operation effective, said actuating ring being provided on its outer circumference with a serially arranged guide number scale and on its inner circumference with cam means for operating pivotally mounted intermediate members which in response to an adjustment of said actuating ring control the adjustment of said adjustable diaphragm, the improvement comprising means for limiting the rotative adjustment of said distance adjusting ring, said means including a series of graduated abutment steps (96) on said distance adjusting ring (1), a deflecting cam (103) on said actuating ring (19), a movably mounted scanning element (91) controlled in its movement by said cam on said actuating ring and movable by said cam into a position which in dependence of the adjusted guide number on said actuating ring causes said scanning element to engage one of said abutment steps on said distance adjusting ring.

3. In a photographic camera, an interchangeable lens system, a distance adjusting ring arranged concentrically about the optical axis of said lens system, an adjustable diaphragm, means providing for flash bulb operation and for a plurality of other operations, such as an automatic exposure adjustment and a manual diaphragm adjustment including a diaphragm preselection, a manually operable actuating ring for selectively adjusting the camera to any one of said operations and for rendering the nonselected operations ineffective, said actuating ring being provided on its outer circumference with a serially arranged guide number scale, a mark for the automatic exposure adjustment and a diaphragm aperture scale for the manual diaphragm adjustment, said actuating ring being provided on its inner circumference with a plurality of cams for operating pivotally mounted intermediate members which in response to an adjustment of said ring control the adjustment of said adjustable diaphragm, the improvement comprising means for limiting the rotative adjustment of said distance adjusting ring, said limiting means including abutment steps on said distance adjusting ring, an element between the abutments of the distance adjusting ring and the actuating ring which is provided on one side facing the abutments with a catch end and on the other side facing away from the abutments forms a scanning member, and a deflection cam on said actuating ring, whereby the scanning end of said element engages the deflection cam of the actuating ring and is controlled by the latter so that the catch end in dependence of the adjusted guide number is caused to engage movement limiting abutments on said distance adjusting ring.

4. In a photographic camera, an interchangeable lens system, a distance adjusting ring arranged concentrically about the optical axis of said lens system, an adjustable diaphragm, means providing for flash bulb operation and for a plurality of other operations, such as an automatic exposure adjustment and a manual diaphragh adjustment including a diaphragm preselection, a manually operable actuating ring for selectively adjusting the camera to any one of said operations and for rendering the non-selected operations ineffective, said actuating ring being provided on its outer circumference with a serially arranged guide number scale, a mark for the automatic exposure adjustment and a diaphragm aperture scale for the manual diaphragm adjustment, said actuating ring being provided on its inner circumference with a plurality of cams for operating pivotally mounted intermediate members which in response to an adjustment of said ring control the adjustment of said adjustable diaphragm, the improvement comprising means for limiting the rotative adjustment of said distance adjusting ring when said camera is adjusted for flash bulb operation, said means including a series of graduated abutment steps (96) on said distance adjusting ring (1), a deflecting cam (103) on said actuating ring (19), a movably mounted scanning element (91) controlled in its movement by said cam on said actuating ring and movable by said cam into a position which in dependence of the adjusted guide number on said actuating ring causes said scanning element to engage one of said abutment steps on said distance adjusting ring.

5. A photographic camera according to claim 4, in which said series of abutment steps when engaged by said scanning element prevent the adjustment of said distance adjusting ring to smaller distances when said actuating ring has been adjusted to higher guide number values, and that said series of abutment steps is provided with one abutment shoulder which prevents the adjustment of said distance adjusting ring to greater distances when said actuating ring has been adjusted to smaller guide number values.

6. A photographic camera according to claim 4, in which said series of abutment steps (96) extend in axial direction of said lens system and in which said scanning element comprises a movably mounted rod extending substantially parallel to the optical axis of said lens system and spring means urging said rod in one direction in which one end of said rod engages said deflecting cam on said actuating ring.

7. A photographic camera according to claim 4, in which said series of abutment steps are arranged on two concentrically oppositely arranged portions (96, 112) of said distance adjusting ring (1) so as to obtain a graduated blocking of smaller and larger distance values (FIG. 2).

8. A photographic camera according to claim 4, in which said series of abutment steps extend along the circumference of said distance adjustment ring and extend in radial direction therefrom that said cooperating scanning element is controlled by a deflecting cam (105) extending radially from said actuating ring, and including spring means for urging said scanning element into engagement with said deflecting cam.

9. A photographic camera according to claim 4, including a releasable locking device for connecting said interchangeable lens system to the camera, and a releasable coupling between said locking device and said scanning element, said coupling when released effecting a removal of said scanning element from said series of abutment steps when said lens system is removed from the camera.

10. A photographic camera according to claim 4, including a releasable locking device for connecting said interchangeable lens system to the camera, means effective upon axial movement of said lens system to selectively release and connect said locking device, and a releasable coupling between said locking device and said scanning element, said coupling when released effecting a removal of said scanning element from said series of abutment steps when said lens system is removed from the camera.

11. A photographic camera according to claim 4, including a disconnecting cam on said actuating ring for removing said scanning element from said abutment steps on said distance adjusting ring when said actuating ring is moved to a position in which any one of the other operation ranges, except said flash bulb operating range, is effective.

12. A photographic camera according to claim 4, in which said series of abutment steps (96) extend in axial direction of said lens system and in which said scanning element comprises a movably mounted rod extending substantially parallel to the optical axis of said lens system and spring means urging said rod in one direction in which one end of said rod engages said deflecting cam on said actuating ring, said actuating ring having on its circumference a disconnecting cam adapted to engage one end of said rod to remove the other end thereof from said abutment steps when said actuating ring is moved away from operating range within which flash bulb exposures are possible.

13. A photographic camera according to claim 4, in which said series of abutment steps (96) extend in axial direction of said lens system and in which said scanning element comprises a movably mounted rod extending substantially parallel to the optical axis of said lens system and spring means urging said rod in one direction in which one end of said rod engages said deflecting cam on said actuating ring, said actuating ring having on its circumference a guide number deflecting cam engaged by a pivotally mounted scanning nose (191) which controls a lateral displacement of said rod, and means forming a yieldable connection between said scanning nose and said rod.

14. A photographic camera according to claim 4, in which said interchangeable lens system has incorporated therein the means for the flash bulb exposure operation, and that said actuating ring with said cams thereon is mounted on said interchangeable lens system.

References Cited in the file of this patent

UNITED STATES PATENTS

| | | |
|---|---|---|
| 2,999,438 | Nerwin | Sept. 12, 1961 |
| 2,999,439 | Nerwin | Sept. 12, 1961 |
| 3,044,377 | Gebele | July 17, 1962 |
| 3,054,337 | Nerwin | Sept. 18, 1962 |